United States Patent
Wood et al.

(10) Patent No.: US 10,210,540 B2
(45) Date of Patent: Feb. 19, 2019

(54) METHODS, SYSTEMS AND APPARATUS TO CALCULATE LONG-TERM EFFECTS OF MARKETING CAMPAIGNS

(71) Applicant: The Nielsen Company (US), LLC, New York, NY (US)

(72) Inventors: Leslie Wood, Copake, NY (US); Andrew K. Faehnle, Euclid, OH (US)

(73) Assignee: The Nielsen Company (US), LLC, New York, NY (US)

( * ) Notice: Subject to any disclaimer, the term of this patent is extended or adjusted under 35 U.S.C. 154(b) by 642 days.

(21) Appl. No.: 14/734,534

(22) Filed: Jun. 9, 2015

(65) Prior Publication Data
US 2016/0140602 A1      May 19, 2016

Related U.S. Application Data

(60) Provisional application No. 62/079,777, filed on Nov. 14, 2014.

(51) Int. Cl.
G06Q 30/00      (2012.01)
G06Q 30/02      (2012.01)

(52) U.S. Cl.
CPC ................ G06Q 30/0244 (2013.01)

(58) Field of Classification Search
None
See application file for complete search history.

(56) References Cited

U.S. PATENT DOCUMENTS 8,818,838 B1 * 8/2014 Sharma ............ G06Q 30/0202
                                            705/7.29
2004/0225553 A1 11/2004 Broady et al.

(Continued)

FOREIGN PATENT DOCUMENTS

GB      2407184 A * 4/2005 ........ G06Q 10/06375

OTHER PUBLICATIONS

Gigerenzer et al. Heuristic Decision Making. (Nov. 15, 2010). Retrieved online Sep. 14, 2018. https://faculty.washington.edu/jmiyamot/p466/pprs/gigerenzer%20heuristic%20decis%20making.pdf (Year: 2010).*

(Continued)

*Primary Examiner* — James A Reagan
(74) *Attorney, Agent, or Firm* — Hanley, Flight & Zimmerman, LLC

(57) ABSTRACT

Methods, apparatus, systems and articles of manufacture are disclosed to calculate long-term effects of marketing campaigns. An example method includes for respective participants, identifying, with a processor, a trial purchase of a first product associated with a brand of interest following a marketing stimulus for the brand of interest, for the respective participants, incrementing, with the processor, a brand purchase count of purchase occasions when a subsequent product associated with the brand of interest is purchased during an exposure period of the marketing stimulus, for the respective participants, resetting, with the processor, the brand purchase count to zero when a subsequent product unassociated with the brand of interest is purchased during the exposure period of the marketing stimulus, generating, with the processor, purchase groups indicative of consecutive purchase occasion values of the respective participants based on respective highest values of the brand purchase count, and calculating, with the processor, the sales effect for the respective purchase groups based on the respective values of the brand purchase count.

20 Claims, 6 Drawing Sheets

(56) References Cited

U.S. PATENT DOCUMENTS

| | | | |
|---|---|---|---|
| 2011/0106584 A1* | 5/2011 | Borthwick | G06Q 30/02 705/7.31 |
| 2013/0046760 A1* | 2/2013 | Evans | G06Q 10/10 707/728 |
| 2013/0231975 A1* | 9/2013 | High | G06Q 30/0201 705/7.29 |
| 2013/0290094 A1 | 10/2013 | Srivastava et al. | |
| 2015/0332290 A1* | 11/2015 | Gerber | G06O 30/02 705/7.29 |

OTHER PUBLICATIONS

CBS Corporation et al., "The Long-Term Effect of Television Advertising Greater thank Previously Thought," Wall Street Journal, Jun. 10, 2014, retrieved from <http://online.wsj.com/article/PR-CO-20140610-909626.html>, retrieved on Nov. 13, 2014 (3 pages).

\* cited by examiner

| PURCHASE DEPTH GROUPS | PARTICIPANT PURCHASE AMOUNT | INCREMENTAL AMT. OF BRAND | INTRO. PERIOD PURCHASE AMT. | SALES EFFECT MULTIPLIER | LONG TERM MULTIPLIER |
|---|---|---|---|---|---|
| 6+ | $64.05 | $16.02 | $3.06 | 5.2 | 6.2 |
| 5 | $48.03 | $6.65 | $2.85 | 2.3 | 3.3 |
| 4 | $41.38 | $5.67 | $2.86 | 2.0 | 3.0 |
| 3 | $35.71 | $7.56 | $2.89 | 2.6 | 3.6 |
| 2 | $28.15 | $3.41 | $2.76 | 1.2 | 2.2 |
| 1 | $24.75 | $20.82 | $3.84 | 5.4 | 6.4 |
| Trial | $7.96 | $6.76 | $4.11 | 1.6 | 2.6 |
| Non-buyer | $3.93 | N/A | N/A | N/A | N/A |
| Non-trier | $1.19 | N/A | N/A | N/A | N/A |

| PURCHASE DEPTH GROUPS | TOTAL SHORT-TERM SALES LIFT | LONG-TERM MULTIPLIER | LONG-TERM SALES PER GROUP |
|---|---|---|---|
| 6+ | $1,101,475 | 6.2 | $6,829,145 |
| 5 | $1,307,370 | 3.3 | $4,314,321 |
| 4 | $1,417,795 | 3.0 | $4,253,385 |
| 3 | $1,623,470 | 3.6 | $5,844,492 |
| 2 | $1,894,291 | 2.2 | $4,167,440 |
| 1 | $3,793,402 | 6.4 | $24,277,772 |
| Trial | $2,653,268 | 2.6 | -- |

302 / 304 / 306 / 308

Sum without Trial: $11,137,803

Total Brand Multiplier: 4.13 ← 310

Total Long-Term Sales: = (4.13) x $11,137,803 = $45,999,126

FIG. 3

METHODS, SYSTEMS AND APPARATUS TO CALCULATE LONG-TERM EFFECTS OF MARKETING CAMPAIGNS

RELATED APPLICATION

This patent claims the benefit of U.S. Provisional Patent Application Ser. No. 62/079,777, which was filed on Nov. 14, 2014, which is incorporated herein by reference in its entirety.

FIELD OF THE DISCLOSURE

This disclosure relates generally to marketing analysis, and, more particularly, to methods, systems and apparatus to calculate long-term effects of marketing campaigns.

BACKGROUND

In recent years, identification of long-term effects of marketing campaigns have relied upon heuristic techniques and/or mere "rules of thumb." Such heuristics are typically used despite one or more variations in a marketing campaign, variations in a brand of interest of the marketing campaign and/or variations in category types of the marketing campaign.

BRIEF DESCRIPTION OF THE DRAWINGS

FIG. 2 is an example purchase group evaluation table to generate long-term multipliers.

FIG. 3 is an example brand-level multiplier table to generate a long-term brand multiplier for a brand of interest.

DETAILED DESCRIPTION

Figure 1:
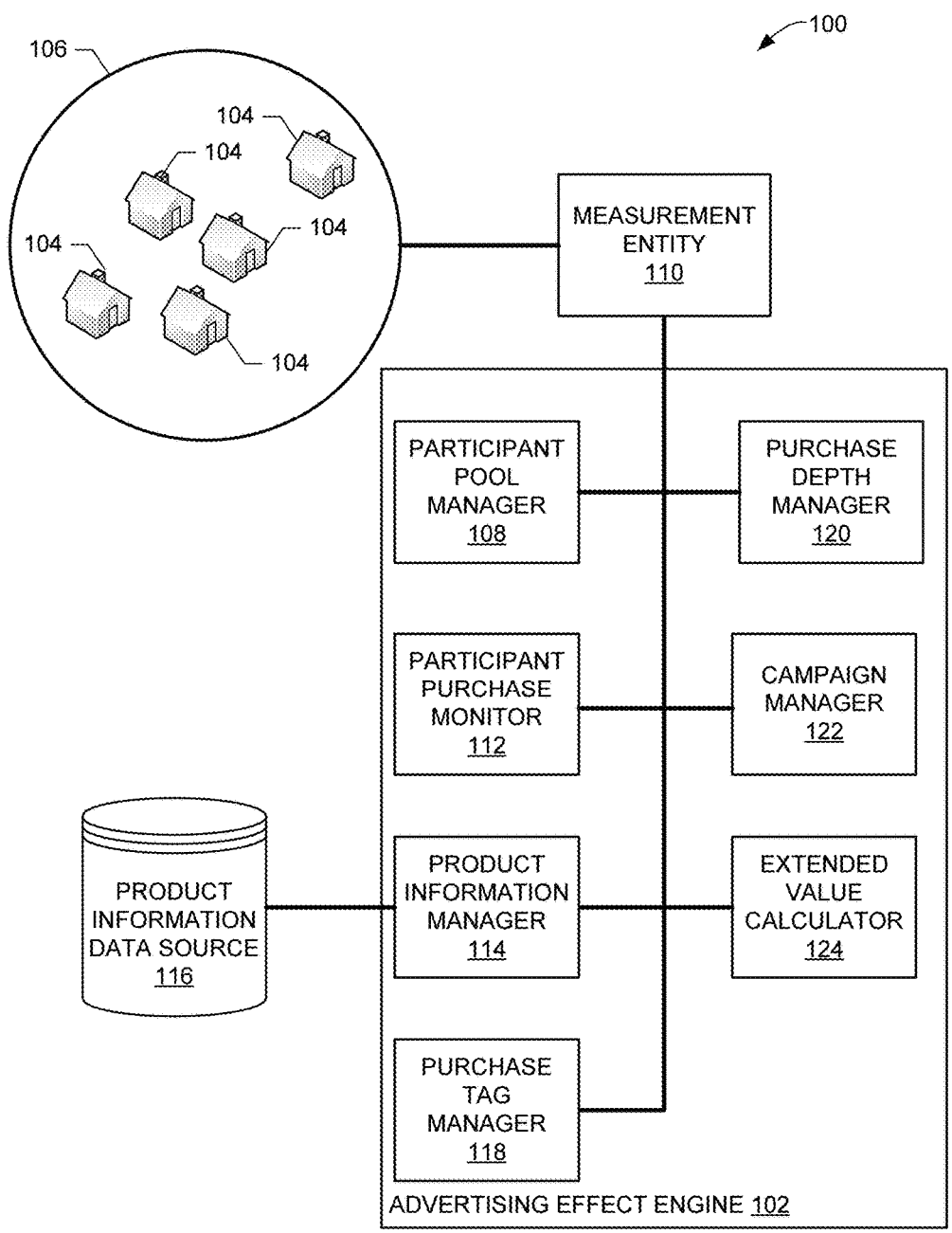
FIG. 1 is a schematic illustration of an example advertising effect system to calculate long-term effects of marketing campaigns constructed in accordance with the teachings of this disclosure.

Long-term effects of marketing have been determined via an assumption that a corresponding short-term effect can simply be multiplied by two. As used herein, "short-term" refers to a period of time initiated by a marketing stimulus, the effects of which (e.g., lift) are measured for approximately four to thirteen weeks. As used herein, "long-term" refers to a period of time following the short-term, which is approximately one year or longer based on, for example, availability of data after the example short-term period ends. Generally speaking, the short-term effect of marketing is determined with a relatively greater degree of accuracy because measurement data is acquired temporally near the marketing activity, such as an advertising campaign and/or a promotional campaign. As used herein, a "promotion" refers to a type of marketing effort in which a product of interest is sold at a discounted price. Such promotional activity encourages product trial and/or purchase at a relatively greater volume than would otherwise occur at a regular (e.g., relatively higher) selling price. As used herein, "advertising" refers to a type of marketing effort in which a product of interest is communicated through one or more media vehicles, such as radio, television, print and/or online activity. Advertisements, as distinguished from promotions, communicate product information and/or expose an audience to audio and/or visual information (e.g., a song, a jingle, a product image, a product trademark) without an associated discounted sale price of the product itself.

When measurement data is acquired prior to the initiation of the marketing activity (e.g., the advertising/promotional campaign, sometimes referred to herein as the "campaign period"), one or more corresponding changes of the acquired measurement data may be observed and/or otherwise noticeable when the marketing activity begins, thereby providing an indication of a short-term effect of the marketing activity. However, challenges in determining a corresponding long-term effect of that marketing activity include customer attrition over longer periods of time, changing customer purchasing behaviors, and competitive activity within a category of interest.

An improved understanding of long-term effects of marketing is important in view of an effect disparity based on a brand of interest, a category of interest and/or particular products of interest within the brand and/or category. Absent an understanding of the long-term effects of marketing may result in marketing waste when overemphasizing advertising versus promotional strategies, or vice versa. For instance, marketing activity may be designed and/or otherwise managed by a marketing analyst to promote a product of interest, to advertise the product of interest, and/or to combine both promotions and advertisements concurrently. Certain products may respond relatively better or worse depending on a type of marketing activity, in which some products exhibit a relatively greater degree of long-term sales in the event the marketing activity included one or more promotions that caused the product to be purchased repeatedly during a marketing exposure period. On the other hand, some products may exhibit a relatively lower purchase frequency during the post marketing exposure period despite the one or more promotions that caused repeated purchase during the marketing exposure period.

Examples disclosed herein improve marketing efficiency so that campaign efforts allocate resources to either advertising, promotions, or combinations thereof. As described in further detail below, examples disclosed herein generate a long-term brand multiplier, which is a metric to facilitate an understanding of a projection of future returns on an applied campaign. The example long-term brand multiplier may be used iteratively for campaign benchmarking, brand benchmarking, and/or recalibration of the brand of interest when competitors enter the market and/or when the brand of interest undergoes a creative redesign. Accordingly, budgets and/or resources associated with the campaign may be allocated in a more efficient manner to reduce waste for future/subsequent media spending plans of campaigns.

In some examples, when advertising is used as the type of marketing activity for a first product (or brand) of interest instead of one or more promotions, the first product of interest exhibits a particular long-term effect that differs from a long-term effect for a second product of interest. Generally speaking, immediate effects from a promotion are apparent in a short-term analysis period, but some products and/or brands of interest exhibit differing effects in response to advertising efforts that a simple heuristic assumption cannot quantify. The short-term effect of advertising tends to be less obvious and/or apparent when compared to the short-term effect of promotions, but a long-term analysis of advertising is typically required to appreciate the advertising effectiveness.

As such, example methods, apparatus, systems and/or articles of manufacture disclosed herein generate one or more metrics (e.g., the long-term brand multiplier) associated with a long-term effect of a product/brand of interest in response to a marketing stimulus, such as an advertising campaign, a promotional campaign and/or a combination thereof. The example metrics associated with a long-term effect of the marketing stimulus allow the market researcher to more efficiently allocate resources (e.g., financial resources, computing resources associated with online advertising, etc.) of one or more marketing campaigns. Examples disclosed herein measure a future value of moving a household into a trial of the brand of interest, and/or a future value of moving a household into a first depth of repeat purchase and/or a relatively higher depth of repeat purchase during a marketing exposure period. As used herein, a depth of repeat purchases refers to products purchased consecutively over a period of time without a competing brand being purchased from a category. In some examples, the metrics provide the market researcher with information regarding what drives long-term sales better for the particular product/brand of interest. Such as whether one or more promotions will have a better likelihood in driving long-term sales as compared to one or more advertisements without a corresponding promotion.

Turning to FIG. 1, an example advertising effect system 100 includes an advertising effect engine 102 communicatively connected to participant households 104 within a region of interest 106, such as a target research geography. While the illustrated example of FIG. 1 includes one region of interest 106, examples disclosed herein are not limited thereto, in which any number of regions of interest may include participant households that provide behavior data via, for example, frequent shopper card data. The example participant households 104 may include panelists measured and/or otherwise managed by a measurement entity (e.g., The Nielsen Company (US), LLC) and/or one or more other entities that have information associated with purchase occasions (e.g., behavior information), such as frequent shopper card data. In some examples, the measurement entity may identify household demographics information.

In the illustrated example of FIG. 1, a participant pool manager 108 is communicatively connected to the participant households 104 to acquire behavior (and, in some examples, demographic information). In some examples, the participant pool manager 108 is communicatively connected to a measurement entity 110, such as The Nielsen Company (US), LLC, while in other examples the participant pool manager 108 is communicatively connected to one or more retailer data sources that contain frequent shopper card data indicative of purchase behavior (e.g., purchase instances of particular categories and/or brands of products). The example advertising effect engine 102 also includes an example participant purchase monitor 112, and an example product information manager 114 communicatively connected to a product information data source 116. The example product information data source 116 may include product specific attribute information such as, but not limited to product name, manufacturer name, brand, packaging type, product size, flavor, lot number, serial number, nutritional information and/or a corresponding universal product code (UPC). In some examples, the product information data source 116 may be implemented as the Nielsen Product Reference Library (PRL) that codes more than 700,000 items, in which each item includes an average of forty (40) descriptive characteristics. The example advertising effect engine 102 also includes an example purchase tag manager 118, an example purchase depth manager 120, which includes a participant counter for each participant (e.g., within one or more participant household(s) 104), an example campaign manager 122 and an example extended value calculator 124.

In operation, the example participant pool manager 108 identifies participants of interest 104 (e.g., participant households, participants having preferred/frequent shopping card data, panelists, etc.) to participate in a long-term analysis of a marketing campaign. As discussed above, the example participants of interest 104 may reside within a particular region of interest 106 in which the marketing campaign is conducted. As described above, each participant of interest 104 may include frequent shopping card data, survey data, and/or one or more panelists that provide and/or otherwise reveal purchase behavior(s). The example participant purchase monitor 112 determines purchase instances associated with each participant of interest. In some examples, the measurement entity 110 obtains purchase behavior via the Nielsen® Homescan® system, which acquires universal product codes (UPCs) scanned by panelists in their homes. The example participant purchase monitor 112 may be communicatively connected to the example measurement entity 110 to acquire purchase instance information as soon as it becomes available, or such purchase instance information is acquired as a batch on a scheduled, periodic, aperiodic and/or manual basis, which may be analyzed by examples disclosed herein after point-of-sale activity has occurred.

Purchases made by participants of interest 104 in the example region of interest 106 are analyzed by the example product information manager 114 to determine whether the purchase instance is associated with a product within a category of interest. For example, the marketing campaign for the analysis includes one or more products for a brand of interest, in which the brand of interest is associated with a particular category. The brand of interest includes any number of competitor brands that also have a presence within the associated category. For any products purchased by a participant that are not associated with the category in which the brand of interest belongs, such purchases are discarded for this study. However, for such product purchases that are associated with the correct/related category, the example product information manager 114 determines whether the purchased product is associated with the brand of interest. If so, the example participant purchase monitor 112 determines whether this is a first purchase made by the participant within the associated household 104 within a particular period of time (e.g., a fixed period of time, such as 1-year, six-months, etc.).

Determining an instance of the first purchase of a product within the brand of interest allows the purchase instance to be compared to a time in which the marketing campaign began. In the event this first purchase instance occurred prior to the initiation of the marketing campaign, then the purchase instance can be discarded from the analysis, as it would not have been influenced by that campaign (e.g., it may be considered a baseline purchase that is outside the scope of this analysis). On the other hand, in the event this first purchase coincides with a time after the marketing campaign began, then that purchase instance may have been influenced by the campaign. As used herein, the participant (e.g., a participant from a household) is identified by the example purchase tag manager 118 as a "Trier" when (a) there has been no prior history of brand purchases, and (b) the marketing campaign has already begun.

When the example product information manager 114 identifies that the purchase is (a) within the category of interest, (b) associated with the brand of interest (i.e., a brand associated with the marketing campaign), and (c) this is not the first time the participant has purchased the brand, then the example purchase depth manager 120 increments the counter associated with the respective participant. On the other hand, when the example product information manager 114 identifies that the purchase is (a) within the category of interest, but (b) not within the brand associated with the marketing campaign, then the example purchase depth manager 120 resets the associated participant counter to a zero count. Said differently, the example purchase depth manager 120 counts the "winning streaks" of consecutive brand purchases by a participant 104. When a non-brand purchase occurs, the consecutive streak is reset to zero, but each purchase by each participant retains the value of the "winning streak" at the time of that purchase, as described in further detail below.

As long as an exposure period of the marketing campaign continues (e.g., a duration in which advertisements, promotions, or combinations thereof occur), any additional brand and non-brand purchases are identified and tagged based on their consecutive purchase depth. When the example campaign manager 122 determines that the exposure period has ended, the campaign manager 122 accumulates category purchases (both in-brand and out-of-brand) during a measurement period that follows the marketing campaign. Said differently, the example measurement period reflects residual effects of the campaign regarding continued purchase behaviors of the marketed product. The example measurement period is typically one year plus a 13-week short-term measurement period, but any other measurement period may be employed with examples disclosed herein. The accumulated category purchases are arranged as average daily brand dollars per participant, as discussed in further detail below. This information is further utilized by the example advertising effect engine 102 to calculate a long-term effect of the exposure period.

Purchasing behavior for the participants 104 (e.g., panelist households, frequent shopper card data, etc.) will exhibit time variation in when purchases occur. After the marketing campaign begins (the exposure period), some participants may make a Trial purchase relatively soon thereafter, while some participants may exhibit a relatively longer delay. To aggregate purchases for all the participants at a greater degree of granularity, the purchases that occurred during the exposure period are time-aligned by the example purchase tag manager 118. Each purchase, which may include multiple participant purchases within a household, is considered an event or moment and, for each participant, the first brand purchase moment that occurred is temporally aligned with the earliest purchase moment that occurred by that participant. As such, the aggregated purchases may be analyzed within common exposure and measurement periods that remove the temporal staggering of the first purchase moment.

The example purchase depth manager 120 generates groups from the aggregated purchase instances, in which each purchase occasion (e.g., by each corresponding participant) is assigned a purchase depth value that is based on a number of consecutive purchases made by respective participants during the exposure period. For example, purchase occasions in which three purchases of a product within the brand of interest consecutively occur are assigned a purchase depth value of three. However, if that participant subsequently purchases a non-brand product, then the purchase occasion is assigned a value of zero. In other words, each time a non-brand purchase (of the same category as the brand of interest) occurs during the exposure period, the example counter associated with that participant is reset to zero by the example purchase depth manager 120. However, as brand purchases consecutively occur, the example counter of the purchase depth manager 120 is incremented to accumulate a number of consecutive purchases (i.e., purchases of the brand of interest that are not interrupted by purchases unassociated with the brand of interest).

In the illustrated example of FIG. 2, a purchase group evaluation table 200 includes a purchase depth group column 202, a participant purchase amount column 204, an incremental brand amount column 206, an introductory period purchase amount column 208, a sales effect multiplier column 210, and a long-term multiplier column 212. The example introductory period reflects the initial portion of an exposure period of the marketing campaign. In some examples, the introductory period reflects an indication of initial marketing momentum for the brand of interest. The example purchase depth groups column 202 is generated by the example purchase depth manager 120 to illustrate an indication of purchase occasions having an example purchase depth upper value of six, but examples disclosed herein are not limited thereto. In some examples, a purchase depth upper value may be different based on the type of category or product therein that is purchased (e.g., one or more purchase occasions) during the evaluation period. Consider laundry soap, for example, in which relatively longer periods of time elapse before a consumer needs to purchase within that category again. On the other hand, consider breakfast cereals, in which consumers generally purchase at a relatively higher frequency during the evaluation period. In some examples, the purchase depth manager 120 sets and/or otherwise establishes a target value of consecutive purchase observations to be met prior to an analysis of collected behavior data. The example target value may be based on a category type of the brand of interest to, for example, reflect purchasing frequency expectations for those products that tend to sell at relatively greater or lesser frequencies.

In the illustrated example of FIG. 2, a Non-Trier row 214 illustrates instances where purchase amounts (e.g., average purchase amounts) occurred within the category during the evaluation period, but the brand of interest was not "Tried" or otherwise purchased by a participant. Additionally, a Non-Buyer row 216 of the illustrated example of FIG. 2 indicates instances where a trial may have occurred with an average purchase amount of category products unassociated with the brand of interest. A Trial row 218 of the illustrated example of FIG. 2 indicates instances of a participant moving from being a non-purchaser of the brand of interest to making an initial trial of the brand of interest after the exposure period (the marketing campaign) begins. A row reflecting a purchase depth value of "1" (220) indicates instances of a participant moving from making a non-brand purchase to making one consecutive subsequent purchase within the brand of interest. That is, the consecutive subsequent purchase was not interrupted by any category purchase activity for a product unassociated with the brand of interest. A similar pattern of grouping occurs in the example purchase group evaluation table 200 of FIG. 2 for participants exhibiting relatively greater numbers of consecutive brand purchases during the evaluation period. When participants exhibit purchase behaviors having a particular depth of repeat, examples disclosed herein use that information to derive an indication on how the short-term campaign effects drive purchase behaviors during a long-term period.

The example participant purchase amount column 204 of the illustrated example of FIG. 2 reflects a purchase amount within by the participant during the measurement period. To identify the incremental purchase amount of the brand of interest, as reflected in the example incremental brand column 206, the example extended value calculator 124 determines the sum over time of one group beyond the spending of a next lower group. To illustrate, consider a row reflecting participant groups having a purchase depth of "3" (222). The purchase amount during the measurement period for participants that exhibited a purchase depth of "3" is $35.71. The next lower group is associated with participants having a purchase depth of "2" (224), which has an associated purchase amount of $28.15. The difference between the purchase amount of these example households is $7.56, which reflects the incremental amount of brand product purchased in the purchase depth "3" (222) compared to the purchase depth "2" (224). Stated differently, the incremental amounts of brand product purchased from one purchase group to the next (adjacent) group is based on a difference value in purchase sums between those groups of participants.

Continuing with the example purchase depth "3" participants (222), the example extended value calculator 124 calculates a long-term sales effect multiplier based on a ratio of the previously calculated incremental brand purchase amount (e.g., $7.56) and an average brand product purchase amount during an introductory period of the marketing campaign (e.g., $2.89), as reflected in the example introductory period purchase amount column 208. The example long-term sales effect multiplier associated with the purchase depth "3" participants is 2.6, as shown in the example sales effect multiplier column 210. In some examples, the extended value calculator 124 calculates a corresponding long-term multiplier for the participant in a manner consistent with example Equation 1.

$$\text{Long Term Multiplier} = \frac{(\text{Incremental Brand } Amt.) + (\text{Introductory Period Purchase } Amt.)}{(\text{Introductory Period Purchase } Amt.)}. \quad \text{Equation 1}$$

In the illustrated example Equation 1, when applied to the example group with the purchase depth of "3", the long-term multiplier is 3.6.

Application of example long-term multipliers to determine a corresponding long-term brand multiplier is illustrated in a brand-level multiplier table 300 of FIG. 3. In the illustrated example of FIG. 3, the brand-level multiplier table 300 includes a purchase depth group column 302 generated by the example purchase depth manager 120 that is based off of the example purchase depth group column 202 of FIG. 2. For each purchase depth value of the example purchase depth group column 302, a corresponding total of sales lift is shown in a short-term sales lift column 304. The example brand-level multiplier table 300 of FIG. 3 also includes a long-term multiplier column 306 that reflects the long-term multipliers calculated above in connection with column 212 of FIG. 2 (see example Equation 1). Values for an example long-term sales per group column 308 are calculated based on the mathematical product of the individual group long-term multiplier from column 306 and the corresponding short-term sales from column 304. Additionally, the example extended value calculator 124 determines a long-term brand multiplier (310) for the brand based on the sum of each depth value long-term multiplier divided by the number of individual depth value groups. As such, a long-term sales lift for the brand may be determined as the mathematical product of the brand multiplier (310) and the sum of individualized short-term sales lift from column 304.

As described above, the example long-term brand multiplier 310 reflects a projection of future returns in view of (a) the brand analyzed and (b) the type of marketing campaign executed. In some examples, results from a first iteration of the analysis may be used as a benchmark so that recalibration of the marketing campaign may occur when one or more other factors change. For instance, in the event other competitors of the brand of interest enter a market, the analysis may be repeated to appreciate a relative change in the strength or value of the marketing campaign. Corresponding shifts in newly determined long-term brand multipliers may be used as a benchmark to invoke alternate campaign strategies that more efficiently allocate marketing resources (e.g., shifting advertising resources to relatively more promotional resources, or vice versa). Accordingly, the metric of the long-term brand multiplier serves to reduce waste and/or otherwise improve campaign resource allocation efficiency.

While an example manner of implementing the advertising effect system 100 of FIG. 1 is illustrated in FIGS. 1-3, one or more of the elements, processes and/or devices illustrated in FIGS. 1-3 may be combined, divided, re-arranged, omitted, eliminated and/or implemented in any other way. Further, the example participant pool manager 108, the example participant purchase monitor 112, the example product information manager 114, the example product information data source 116, the example purchase tag manager 118, the example purchase depth manager 120, the example campaign manager 122, the example extended value calculator 124 and/or, more generally, the example advertising effect system 100 of FIG. 1 may be implemented by hardware, software, firmware and/or any combination of hardware, software and/or firmware. Thus, for example, any of the example participant pool manager 108, the example participant purchase monitor 112, the example product information manager 114, the example product information data source 116, the example purchase tag manager 118, the example purchase depth manager 120, the example campaign manager 122, the example extended value calculator 124 and/or, more generally, the example advertising effect system 100 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example participant pool manager 108, the example participant purchase monitor 112, the example product information manager 114, the example product information data source 116, the example purchase tag manager 118, the example purchase depth manager 120, the example campaign manager 122, the example extended value calculator 124 and/or, more generally, the example advertising effect system 100 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example advertising effect system 100 of FIG. 1 may include one or more elements, processes and/or devices in addition to, or instead of, those illustrated in FIGS. 1-3, and/or may include more than one of any or all of the illustrated elements, processes and devices.

Figure 4:
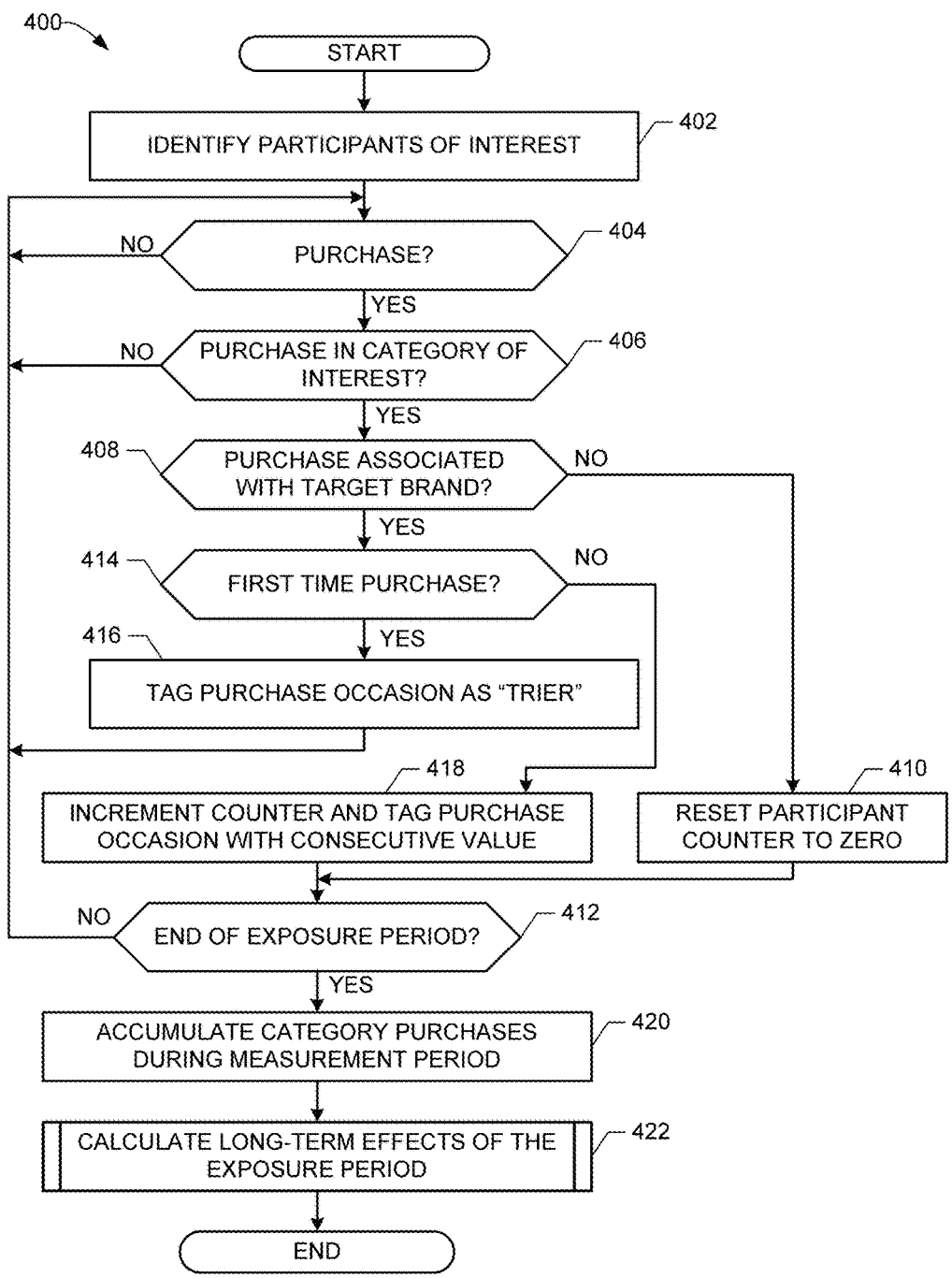
FIGS. 4-5 are flowcharts representative of example machine readable instructions that may be executed to implement the example advertising effect system of FIG. 1.
Figure 5:
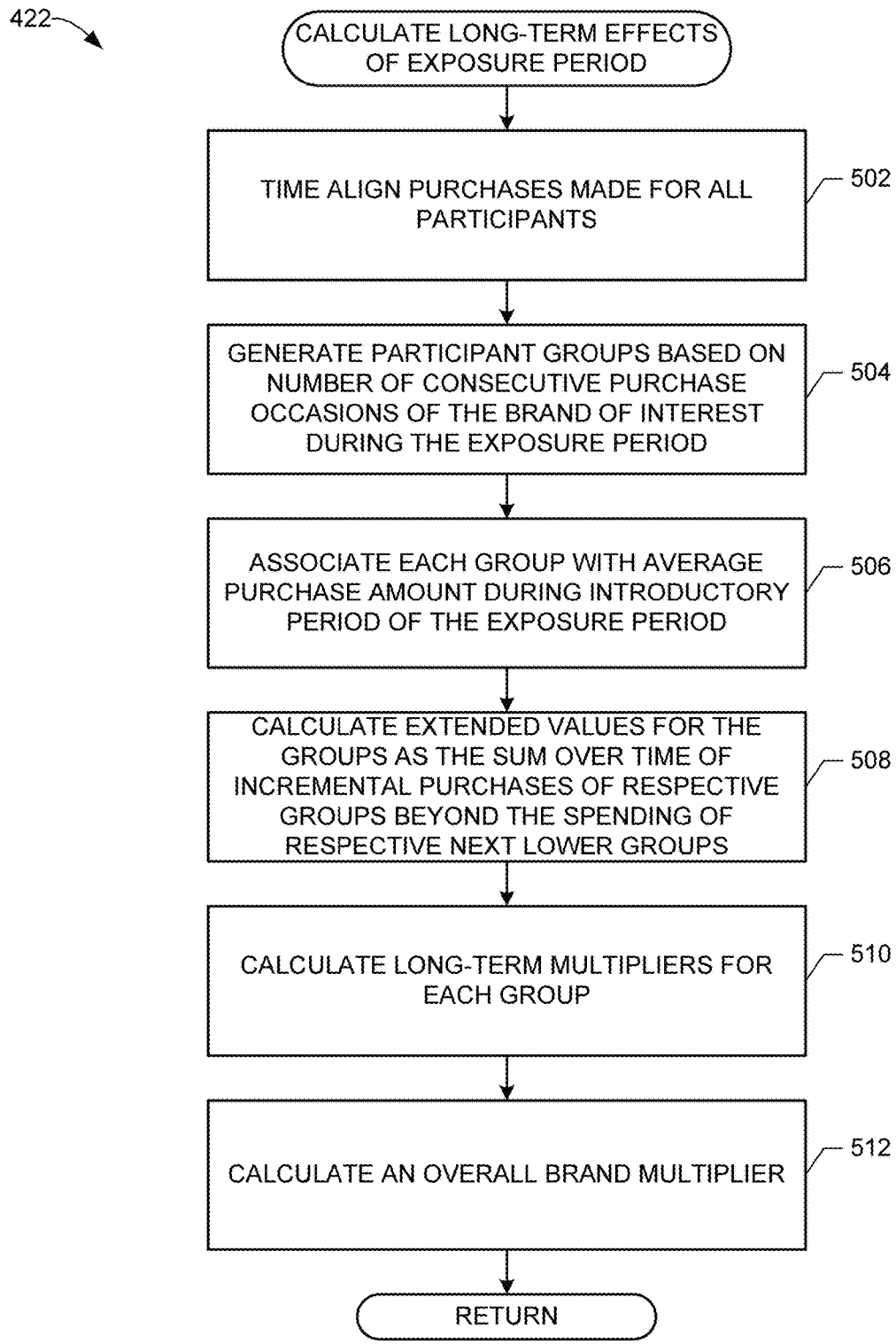

Flowcharts representative of example machine readable instructions for implementing the advertising effect system 100 of FIG. 1 is shown in FIGS. 4-5. In these examples, the machine readable instructions comprise program(s) for execution by a processor such as the processor 612 shown in the example processor platform 600 discussed below in connection with FIG. 6. The program(s) may be embodied in software stored on a tangible computer readable storage medium such as a CD-ROM, a floppy disk, a hard drive, a digital versatile disk (DVD), a Blu-ray disk, or a memory associated with the processor 612, but the entire program(s) and/or parts thereof could alternatively be executed by a device other than the processor 612 and/or embodied in firmware or dedicated hardware. Further, although the example program(s) are described with reference to the flowcharts illustrated in FIGS. 4-5, many other methods of implementing the example advertising effect system 100 may alternatively be used. For example, the order of execution of the blocks may be changed, and/or some of the blocks described may be changed, eliminated, or combined.

As mentioned above, the example processes of FIGS. 4-5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example program 400 of FIG. 4 begins at block 402 where the example participant pool manager 108 identifies participants of interest. In some examples, the participants of interest reside in a particular geography of interest in which a long-term brand multiplier (e.g., the brand multiplier 310 of FIG. 3) is to be determined. The example participant purchase monitor 112 determines whether a purchase has occurred and/or purchase data is available for analysis (block 404). If so, the example product information manager 114 determines whether the observed purchase is within a desired category of interest for the study (block 406). For instance, if not (block 406), then the observed purchase is ignored, and control of the example program 400 returns to block 404. On the other hand, if the observed purchase is within a desired category of interest, then the example product information manager 114 determines if the observed purchase is for a product associated with the brand of interest (block 408).

As described above, when a purchase occurs that is not associated with the target brand of interest, then the consecutive "winning" streak of purchases (if any) ends. In such cases, the example purchase depth manager 120 resets a household counter to zero for the participant associated with the purchase instance (block 410). The example campaign manager 122 determines whether the exposure period has ended (block 412) and, if not, control returns to block 404 to observe and/or otherwise analyze more purchases. In the event that the observed purchase is associated with the brand of interest (e.g., the brand associated with a marketing study to determine the example long-term multiplier 310 of FIG. 3) (block 408), then the example purchase monitor 112 determines whether the brand purchase is the first time the particular participant has purchased this brand of product (block 414). If so, then the purchase instance is tagged as a "Trier" (block 416) and control returns to block 404.

When the observed purchase occasion is not the first time the participant has purchased the target brand of interest (block 414), then the example purchase depth manager increments the counter associated with the participant to keep track of how many consecutive brand purchase instances occur without interruption by a non-brand purchase within the category of interest (block 418). As shown in the illustrated example of FIG. 4, the program iterates during the exposure period to count the highest number of consecutive in-brand purchases that occur without non-brand interruption. When the exposure period ends (block 412), then the example campaign manager 122 accumulates dollar amounts associated with all additional category purchases that are both in-brand and out-of-brand during a post-exposure measurement period (block 420). In some examples, the campaign manager 122 determines an average weekly brand dollars purchased per participant after the measurement period has ended. With this accumulated information, the example advertising effect engine 102 calculates long-term effects of the corresponding exposure period (block 422).

FIG. 5 illustrates additional detail of the example advertising effect engine 102 calculating long-term effects of block 422. In the illustrated example of FIG. 5, the purchase tag manager 118 time-aligns purchases made by all the participants that have been observed to make at least a trial purchase (block 502). The example purchase depth manager 120 generates participant groups that are based on the highest number of consecutive in-brand purchases that have occurred during the exposure period by those respective participants (block 504). As described above, this consecutive purchase depth count is sometimes referred to herein as the "winning streak" count. The example participant purchase monitor 112 associates each group with its corresponding purchase amount during the introductory period of the exposure period (block 506).

The example extended value calculator 124 calculates extended values for respective groups (e.g., the example purchase depth "1" group 220, the example purchase depth "2" group 224, etc.) as the sum over time of purchases beyond a spending value of a next lower group (block 508).

As described above, this is sometimes referred to herein as the incremental purchase amount of the brand of interest. Examples of incremental purchase amounts are shown in the illustrated example of FIG. 2 (see column 206), and are used to calculate sales effect multipliers for each group (block 510, and see column 210 of FIG. 2). Additionally, the example extended value calculator 124 determines corresponding long-term multipliers for each group in a manner consistent with example Equation 1 (block 510, see column 212 of FIG. 2). Using the corresponding long-term multipliers from each purchase depth group, the example extended value calculator 124 calculates an overall brand multiplier associated with the campaign based on the sum of long-term multipliers divided by the number of distinct purchase depth groups observed to make purchases during the campaign period (block 512).

Figure 6:
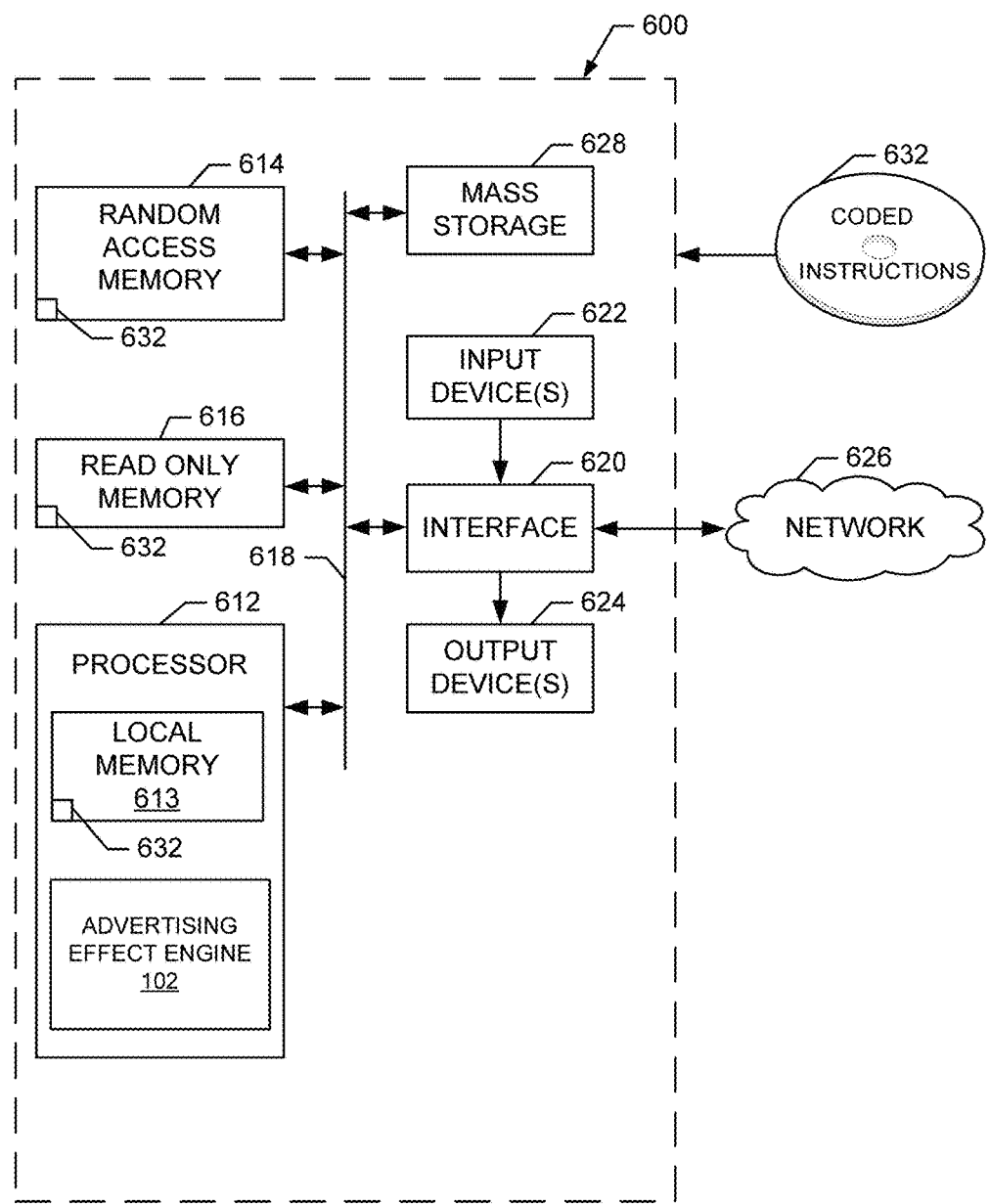
FIG. 6 is a schematic illustration of an example processor platform that may execute the instructions of FIGS. 4-5 to implement the example advertising effect system of FIG. 1.

FIG. 6 is a block diagram of an example processor platform 600 capable of executing the instructions of FIGS. 4-5 to implement the advertising effect system 100 of FIG. 1. The processor platform 600 can be, for example, a server, a personal computer, a mobile device (e.g., a cell phone, a smart phone, a tablet such as an iPad™), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIGS. 4-5 may be stored in the mass storage device 628, in the volatile memory 614, in the non-volatile memory 616, and/or on a removable tangible computer readable storage medium such as a CD or DVD.

From the foregoing, it will be appreciated that the above disclosed methods, apparatus and articles of manufacture advance beyond traditional marketing heuristics that generalized a long-term effect of a marketing campaign as two times the short-term effect. Instead, examples disclosed herein employ an empirically based determination of a long-term effect of a campaign based on (a) sales during an introductory period when the marketing campaign begins, (b) a purchase depth of consecutive in-brand purchases, and (c) an analysis of brand sales after the marketing campaign ends. Such empirical techniques disclosed herein afford a market researcher the ability to establish a metric to assess a campaign efficacy, as well as utilizing such a metric on a relative comparison to other campaigns.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computer implemented method to improve an efficiency of marketing campaign computing resource allocation, the method comprising:

for respective participants, identifying, by executing instructions with a processor, a trial purchase of a first product associated with a brand of interest following a marketing stimulus for the brand of interest;

for the respective participants, incrementing, by executing instructions with the processor, a brand purchase count of purchase occasions when a subsequent product associated with the brand of interest is purchased during a first period of time;

for the respective participants, resetting, by executing instructions with the processor, the brand purchase count to zero when a subsequent product unassociated with the brand of interest is purchased during the first period of time;

preventing heuristic error by generating, by executing instructions with the processor, purchase groups indicative of consecutive purchase occasion values of the respective participants based on respective highest values of the brand purchase count, the consecutive purchase occasion values indicative of brand purchase instances not interrupted by purchase instances unassociated with the brand of interest;

calculating, by executing instructions with the processor, a first sales effect for the respective purchase groups based on the respective values of the brand purchase count, the first sales effect associated with the first period of time; and improving the efficiency of a marketing campaign computing resource allocation by comparing, by executing instructions with the processor, the first sales effect to a second sales effect, the second sales effect associated with a second period of time, the comparison to prevent computational waste by identifying a type of marketing activity associated with a larger one of the first sales effect or the second sales effect.

2. A computer implemented method as defined in claim 1, further including determining, for the respective purchase groups, a category purchase amount for the brand of interest within a measurement period following an exposure period of the marketing stimulus.

3. A computer implemented method as defined in claim 2, further including determining, for the respective purchase groups, an incremental purchase amount of the brand of interest based on a difference value of respective adjacent purchase group purchases.

4. A computer implemented method as defined in claim 3, further including determining, for the respective purchase groups, a long-term sales effect multiplier based on a ratio of (a) the incremental purchase amount of the brand of interest and (b) an average brand product purchase amount during an introductory period of the marketing stimulus.

5. A computer implemented method as defined in claim 3, further including determining, for the respective purchase groups, a long-term brand multiplier based on a sum of respective long-term sales effect multipliers divided by a total number of the respective purchase groups.

6. A computer implemented method as defined in claim 2, wherein the category purchase amount for the brand of interest includes an average category purchase amount.

7. A computer implemented method as defined in claim 1, wherein the subsequent product unassociated with the brand of interest is associated with a category associated with the brand of interest.

8. A computer implemented method as defined in claim 1, further including setting a target value of the consecutive purchase occasion values based on a category type of the product.

9. An apparatus to improve an efficiency of marketing campaign computing resource allocation, the apparatus comprising:

a participant purchase monitor to identify, for respective participants, a trial purchase of a first product associated with a brand of interest following a marketing stimulus for the brand of interest;

a purchase depth manager to:

increment, for the respective participants, a brand purchase count of purchase occasions when a subsequent product associated with the brand of interest is purchased during a first period of time;

reset, for the respective participants, the brand purchase count to zero when a subsequent product unassociated with the brand of interest is purchased during the first period of time; and prevent heuristic error by generating purchase groups indicative of consecutive purchase occasion values of the respective participants based on respective highest values of the brand purchase count, the consecutive purchase occasion values indicative of brand purchase instances not interrupted by purchase instances unassociated with the brand of interest; and an extended value calculator to:

calculate a first sales effect for the respective purchase groups based on the respective values of the brand purchase count, the first sales effect associated with the first period of time; and improve the efficiency of a marketing campaign computing resource allocation by comparing the first sales effect to a second sales effect, the second sales effect associated with a second period of time, the comparison to prevent computational waste by identifying a type of marketing activity associated with a larger one of the first sales effect or the second sales effect.

10. An apparatus as defined in claim 9, wherein the extended value calculator is to determine a category purchase amount for the brand of interest within a measurement period following an exposure period of the marketing stimulus.

11. An apparatus as defined in claim 10, wherein the extended value calculator is to determine an incremental purchase amount of the brand of interest based on a difference value of respective adjacent purchase group purchases.

12. An apparatus as defined in claim 11, wherein the extended value calculator is to determine a long-term sales effect multiplier based on a ratio of (a) the incremental purchase amount of the brand of interest and (b) an average brand product purchase amount during an introductory period of the marketing stimulus.

13. An apparatus as defined in claim 11, wherein the extended value calculator is to determine a long-term brand multiplier based on a sum of respective long-term sales effect multipliers divided by a total number of the respective purchase groups.

14. An apparatus as defined in claim 9, wherein the purchase depth manager is to identify that the subsequent product unassociated with the brand of interest is associated with a category associated with the brand of interest.

15. An apparatus as defined in claim 9, wherein the purchase depth manager is to set a target value of the consecutive purchase occasion values based on a category type of the product.

16. A tangible computer readable storage medium comprising computer readable instructions that, when executed, cause a processor to at least:

for respective participants, identify a trial purchase of a first product associated with a brand of interest following a marketing stimulus for the brand of interest;

for the respective participants, increment a brand purchase count of purchase occasions when a subsequent product associated with the brand of interest is purchased during a first period of time;

for the respective participants, reset the brand purchase count to zero when a subsequent product unassociated with the brand of interest is purchased during the first period of time;

prevent heuristic error by generating purchase groups indicative of consecutive purchase occasion values of the respective participants based on respective highest values of the brand purchase count, the consecutive purchase occasion values indicative of brand purchase instances not interrupted by purchase instances unassociated with the brand of interest;

calculate a first sales effect for the respective purchase groups based on the respective values of the brand purchase count, the first sales effect associated with the first period of time; and improve an efficiency of a marketing campaign computing resource allocation by comparing the first sales effect to a second sales effect, the second sales effect associated with a second period of time, the comparison to prevent computational waste by identifying a type of marketing activity associated with a larger one of the first sales effect or the second sales effect.

17. A storage medium as defined in claim 16, wherein the instructions, when executed, cause the processor to determine, for the respective purchase groups, a category purchase amount for the brand of interest within a measurement period following an exposure period of the marketing stimulus.

18. A storage medium as defined in claim 17, wherein the instructions, when executed, cause the processor to determine, for the respective purchase groups, an incremental purchase amount of the brand of interest based on a difference value of respective adjacent purchase group purchases.

19. A storage medium as defined in claim 18, wherein the instructions, when executed, cause the processor to determine, for the respective purchase groups, a long-term sales effect multiplier based on a ratio of (a) the incremental purchase amount of the brand of interest and (b) an average brand product purchase amount during an introductory period of the marketing stimulus.

20. A storage medium as defined in claim 18, wherein the instructions, when executed, cause the processor to determine, for the respective purchase groups, a long-term brand multiplier based on a sum of respective long-term sales effect multipliers divided by a total number of the respective purchase groups.

* * * * *

UNITED STATES PATENT AND TRADEMARK OFFICE
CERTIFICATE OF CORRECTION

| | | |
|---|---|---|
| PATENT NO. | : 10,210,540 B2 | Page 1 of 1 |
| APPLICATION NO. | : 14/734534 | |
| DATED | : February 19, 2019 | |
| INVENTOR(S) | : Leslie Wood and Andrew K. Faehnle | |

It is certified that error appears in the above-identified patent and that said Letters Patent is hereby corrected as shown below:

On the Title Page

Column 1, (73) Assignee: replace:
"The Nielsen Company (US), LLC, New York, NY (US)"

With:
-- NC Ventures, LLC d/b/a Nielsen Catalina Solutions, Cincinnati, OH (US) --

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*